US008617387B2

(12) United States Patent
Krishna et al.

(10) Patent No.: US 8,617,387 B2
(45) Date of Patent: *Dec. 31, 2013

(54) CATALYTIC PROCESSES AND SYSTEMS FOR BASE OIL PRODUCTION FROM LIGHT FEEDSTOCK

(75) Inventors: Kamala Krishna, Danville, CA (US); Guan-Dao Lei, Walnut Creek, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 266 days.

This patent is subject to a terminal disclaimer.

(21) Appl. No.: 13/159,634

(22) Filed: Jun. 14, 2011

(65) Prior Publication Data

US 2011/0319685 A1     Dec. 29, 2011

Related U.S. Application Data

(60) Provisional application No. 61/359,678, filed on Jun. 29, 2010.

(51) Int. Cl.
*C10G 35/04* (2006.01)

(52) U.S. Cl.
USPC .......................................... 208/134; 585/310

(58) Field of Classification Search
USPC ............................... 208/20, 28, 134
See application file for complete search history.

(56) References Cited

U.S. PATENT DOCUMENTS

| | | | |
|---|---|---|---|
| 3,852,207 A | 12/1974 | Stangeland et al. | |
| 4,913,797 A * | 4/1990 | Albinson et al. | 208/89 |
| 5,951,848 A | 9/1999 | Baker, Jr. et al. | |
| 6,187,725 B1 | 2/2001 | Kramer et al. | |
| 6,468,417 B1 | 10/2002 | Biscardi et al. | |
| 6,468,418 B1 | 10/2002 | Biscardi et al. | |
| 7,141,529 B2 | 11/2006 | Biscardi et al. | |
| 7,384,538 B2 * | 6/2008 | Miller | 208/89 |
| 2004/0186006 A1 * | 9/2004 | Biscardi et al. | 502/64 |
| 2006/0091043 A1 | 5/2006 | Miller | |
| 2006/0229193 A1 | 10/2006 | Biscardi et al. | |
| 2008/0083657 A1 * | 4/2008 | Zones et al. | 208/134 |
| 2009/0166252 A1 | 7/2009 | Daage et al. | |
| 2009/0326289 A1 * | 12/2009 | Petri et al. | 585/263 |
| 2011/0079540 A1 | 4/2011 | Krishna et al. | |

OTHER PUBLICATIONS

PCT International Search Report, PCT/US2011/041749, mailed Feb. 29, 2012.
E. P. Barrett, L.G. Joyner, and P.P. Halenda "The Determination of Pore Volume and Area Distributions in Porous Substances. I. Computations from Nitrogen Isotherms," J. Am. Chem. Soc. 1951, 73, 373-380.

* cited by examiner

*Primary Examiner* — Randy Boyer
*Assistant Examiner* — Juan Valencia
(74) *Attorney, Agent, or Firm* — Michael D. Ross; E. Joseph Gess; Terrence Flaherty

(57) ABSTRACT

Processes and catalyst systems are provided for dewaxing a light hydrocarbon feedstock to form a lubricant base oil. A layered catalyst system of the present invention may comprise a first hydroisomerization dewaxing catalyst disposed upstream from a second hydroisomerization dewaxing catalyst. Each of the first and second hydroisomerization dewaxing catalysts may be selective for the isomerization of n-paraffins. The first hydroisomerization catalyst may have a higher level of selectivity for the isomerization of n-paraffins than the second hydroisomerization dewaxing catalyst.

14 Claims, 2 Drawing Sheets

CATALYTIC PROCESSES AND SYSTEMS FOR BASE OIL PRODUCTION FROM LIGHT FEEDSTOCK

This application claims the benefit under 35 USC 119 of Provisional Application No. 61/359,678, filed Jun. 29, 2010.

FIELD OF THE INVENTION

This invention relates to processes and systems for dewaxing hydrocarbon feedstocks.

BACKGROUND OF THE INVENTION

High quality lubricating oils are critical for the operation of modern machinery and motor vehicles. However, current crude oil supplies are inadequate to meet present demands for such lubricants. Therefore, it is necessary to upgrade crude oil fractions otherwise unsuitable for lubricant manufacture. As an example, high-quality lubricating oils must often be produced from waxy feeds. Numerous processes have been proposed for producing lubricating base oils by upgrading ordinary and low quality feedstocks. Hydrocarbon feedstocks may be catalytically dewaxed by hydrocracking or hydroisomerization. Hydrocracking generally leads to a loss in yield due to the production of lower molecular weight hydrocarbons, such as middle distillates and even lighter $C_{4-}$ products, whereas hydroisomerization generally provides higher yields by minimizing cracking.

U.S. Pat. No. 7,384,538 discloses hydroisomerization of waxy feed for base oil production in an isomerization zone comprising a catalyst bed having at least two isomerization catalysts, wherein a first catalyst has a channel diameter of at least 6.2 Å, and a second catalyst has a channel diameter not more than 5.8 Å. U.S. Patent Application Publication No. 2008/0083657 discloses dewaxing a hydrocarbon feed with a metal-modified small crystallite MTT framework molecular sieve. U.S. Patent Application Publication No. 2009/0166252 discloses lube basestock production using two isomerization catalysts, wherein a first catalyst has a Constraint Index (CI) of not more than 2, and a second catalyst has a CI greater than 2.

Apart from product yield, another important factor in the catalytic production of base oil is the minimization of catalyst aging. In this regard, U.S. Pat. No. 5,951,848 discloses the use of a two catalyst system comprising a hydrotreating catalyst and a dewaxing catalyst. The aging of the dewaxing catalyst may be slowed by the presence of the hydrotreating catalyst layer.

U.S. Pat. Nos. 6,468,417 and 6,468,418 disclose the production of lube oil having a reduced tendency to form a haze by a process including contacting a dewaxed lube stock or base oil feed with a solid sorbent to produce a dehazed base oil having a reduced cloud point relative to that of the dewaxed lube stock or base oil feed.

There is a continuing need for improved dewaxing processes and catalyst systems showing increased isomerization selectivity and conversion of waxy hydrocarbon feedstocks for the production of valuable Group II and Group III base oils.

SUMMARY OF THE INVENTION

This invention relates to processes for efficiently converting wax-containing hydrocarbon feedstocks into high-grade products, including lubricant base oils having a low pour point, a low cloud point, a low pour-cloud spread, and a high viscosity index (VI). Such processes employ a layered catalyst system comprising a plurality of hydroisomerization dewaxing catalysts. Hydroisomerization converts aliphatic, unbranched paraffinic hydrocarbons (n-paraffins) to isoparaffins and cyclic species, thereby decreasing the pour point and cloud point of the base oil product as compared with the feedstock. In an embodiment, a layered catalyst system of the present invention may further comprise a hydrotreating catalyst as a guard layer, whereby "aging" of the hydroisomerization catalysts is decelerated, and base oil product yield can be maintained for longer periods of time, as compared with conventional processes, at a temperature in the range from about 450° F. to about 725° F. (232° C. to 385° C.).

According to one aspect of the present invention there is provided a process for catalytically dewaxing a light waxy hydrocarbon feedstock comprising contacting the hydrocarbon feedstock in a first hydroisomerization zone under first hydroisomerization dewaxing conditions with a first hydroisomerization catalyst to provide a first isomerization stream, and contacting at least a portion of the first isomerization stream in a second hydroisomerization zone under second hydroisomerization dewaxing conditions with a second hydroisomerization catalyst to provide a second isomerization stream. Each of the first hydroisomerization catalyst and the second hydroisomerization catalyst may comprise a 1-D, 10-ring molecular sieve and a Group VIII metal. The first hydroisomerization catalyst has a first level of selectivity for the isomerization of n-paraffins in the feedstock, the second hydroisomerization catalyst has a second level of selectivity for the isomerization of n-paraffins in the feedstock, and the first level of selectivity may be higher than the second level of selectivity.

In an embodiment, the present invention provides a process for catalytically dewaxing a waxy hydrocarbon feedstock comprising contacting the hydrocarbon feedstock in a first hydroisomerization zone under first hydroisomerization dewaxing conditions with a first hydroisomerization catalyst to provide a first isomerization stream, contacting at least a portion of the first isomerization stream in a second hydroisomerization zone under second hydroisomerization dewaxing conditions with a second hydroisomerization catalyst to provide a second isomerization stream, and contacting the second isomerization stream with a hydrofinishing catalyst to provide a base oil product. Each of the first hydroisomerization catalyst and the second hydroisomerization catalyst may comprise a 1-D, 10-ring molecular sieve and a Group VIII metal. The first hydroisomerization catalyst has a first level of selectivity for the isomerization of n-paraffins in the feedstock, the second hydroisomerization catalyst has a second level of selectivity for the isomerization of n-paraffins, and the first level of selectivity may be higher than the second level of selectivity. The first hydroisomerization catalyst may be doped with a metal modifier selected from the group consisting of Mg, Ca, Sr, Ba, K, La, Pr, Nd and Cr. The second hydroisomerization catalyst may consist essentially of a refractory oxide binder, the molecular sieve, and the Group VIII metal. The first and second hydroisomerization catalysts may be disposed in the same reactor. The base oil product may have a pour point of not more than about −12° C. and a pour-cloud spread of not more than about 5° C.

In another embodiment, the present invention provides a layered catalyst system comprising a first hydroisomerization zone comprising a first hydroisomerization catalyst, and a second hydroisomerization zone comprising a second hydroisomerization catalyst. Each of the first hydroisomerization catalyst and the second hydroisomerization catalyst may comprise a 1-D, 10-ring molecular sieve and a Group VIII metal. Each of the first hydroisomerization catalyst and the second hydroisomerization catalyst may be selective for the isomerization of n-paraffins. The first hydroisomerization catalyst has a first level of selectivity for the isomerization of n-paraffins, the second hydroisomerization catalyst has a second level of selectivity for the isomerization of n-paraffins, and the first level of selectivity may be higher than the second level of selectivity. The first hydroisomerization zone may be disposed upstream from the second hydroisomerization zone, and the first hydroisomerization catalyst and the second hydroisomerization catalyst may be disposed within a single reactor.

DETAILED DESCRIPTION OF THE INVENTION

Figure 1:
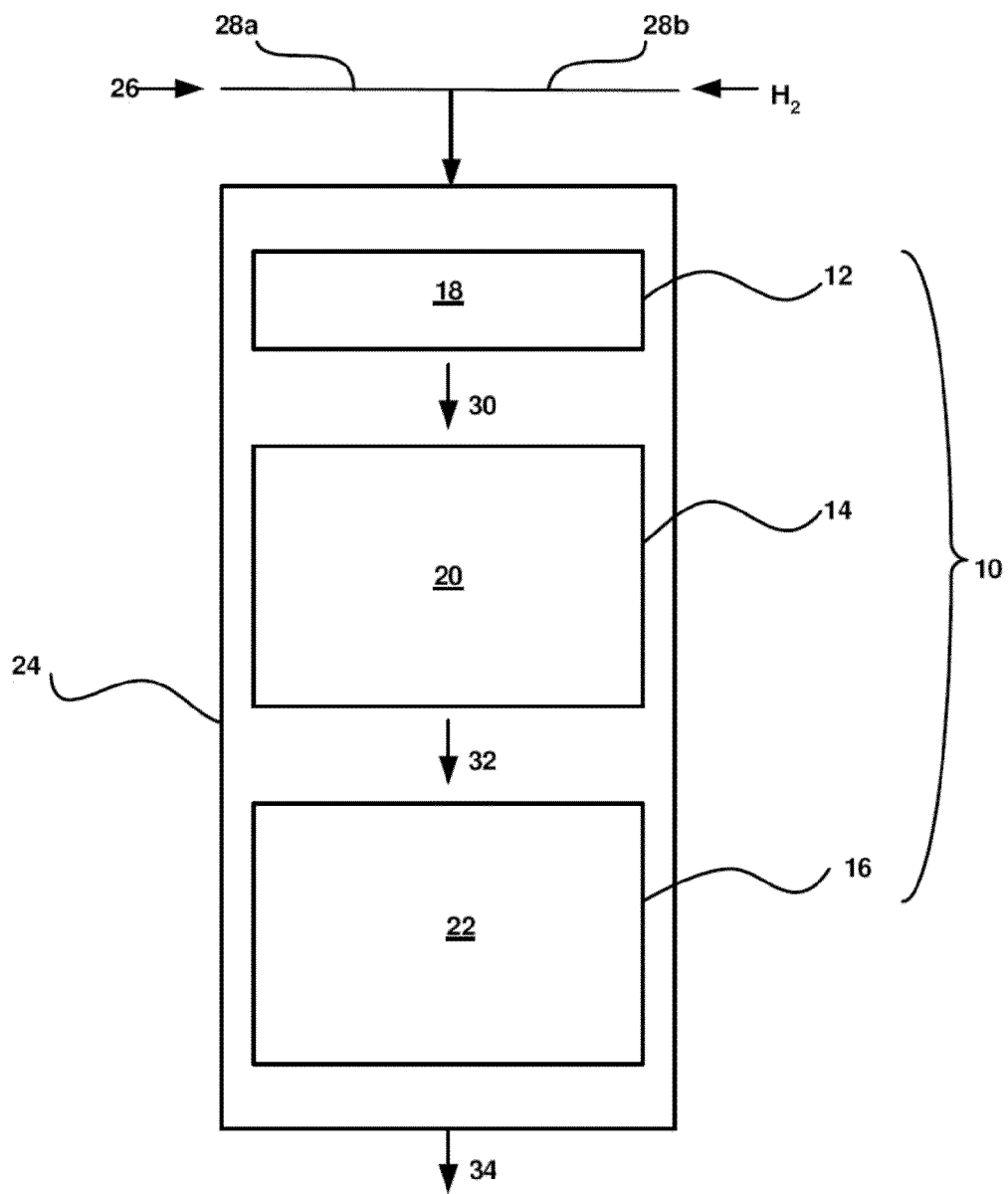
FIG. 1 schematically represents a system for hydrocarbon dewaxing processes, according to an embodiment of the present invention.

The present invention provides a hydrocarbon dewaxing process which involves contacting a hydrocarbon feedstock with a layered catalyst system comprising a first hydroisomerization catalyst and a second hydroisomerization catalyst. In an embodiment, the present invention also provides a catalyst system for dewaxing a hydrocarbon feedstock, wherein the first hydroisomerization catalyst may be upstream from the second hydroisomerization catalyst.

In an embodiment, the first hydroisomerization catalyst may be in a first hydroisomerization layer or zone of the catalyst system, and the second hydroisomerization catalyst may be in a second hydroisomerization layer or zone of the catalyst system. The first hydroisomerization catalyst and the second hydroisomerization catalyst may be in the same reactor. The first hydroisomerization catalyst and the second hydroisomerization catalyst may be disposed in separate beds in the same reactor. Alternatively, at least a portion of the first hydroisomerization catalyst may be in the same bed as at least a portion of the second hydroisomerization catalyst, and/or at least a portion of the second hydroisomerization catalyst may be in the same bed as at least a portion of the first hydroisomerization catalyst.

Applicants have now demonstrated that layered catalyst systems of the present invention comprising first and second hydroisomerization catalysts with a combined volume, V, can provide superior results, e.g., overall greater isomerization selectivity as determined by increased yield and/or higher viscosity index (VI) of the base oil product, as compared with the same volume (V) of either the first hydroisomerization catalyst alone or the second hydroisomerization catalyst alone.

In an embodiment, catalyst systems of the present invention may further comprise a hydrotreating catalyst. The hydrotreating catalyst may comprise, and may function as, a guard layer or guard bed. The hydrotreating catalyst of the guard layer may be disposed upstream from the first hydroisomerization catalyst. The hydrotreating catalyst of the guard layer may serve to protect the first and second hydroisomerization catalysts from contaminants in the feedstock that could deactivate the hydroisomerization catalysts. Thus, the presence of the guard layer can substantially increase the longevity of the first and second hydroisomerization catalysts. In an embodiment, the guard layer may be disposed in the same reactor as the first and second hydroisomerization catalysts. Accordingly, processes of the present invention may be practiced in a single reactor.

In an embodiment, the reaction conditions for processes of the present invention may be determined, inter alia, by the temperature required for the first and second hydroisomerization catalysts to achieve a target pour point of a desired base oil product of the invention. Typically, the hydroisomerization catalysts may have an operating temperature in the range from about 390° F. to about 800° F. (199° C. to 427° C.), and usually from about 550° F. to about 750° F. (288° C. to 399° C.). In practice, the process temperature may depend on various other process parameters, such as the feed composition, the feed rate, the operating pressure, the formulation of the catalyst system, and the "age" of the hydroisomerization catalysts.

Definitions

The following terms used herein have the meanings as defined herein below, unless otherwise indicated.

The term "hydrotreating" refers to processes or steps performed in the presence of hydrogen for the hydrodesulfurization, hydrodenitrogenation, hydrodemetallation, and/or hydrodearomatization of components (e.g., impurities) of a hydrocarbon feedstock, and/or for the hydrogenation of unsaturated compounds in the feedstock. Depending on the type of hydrotreating and the reaction conditions, products of hydrotreating processes may have improved viscosities, viscosity indices, saturates content, low temperature properties, volatilities and depolarization, for example.

The terms "guard layer" and "guard bed" may be used herein synonymously and interchangeably to refer to a hydrotreating catalyst or hydrotreating catalyst layer. The guard layer may be a component of a catalyst system for hydrocarbon dewaxing, and may be disposed upstream from at least one hydroisomerization catalyst.

As used herein the term "molecular sieve" refers to a crystalline material containing pores, cavities, or interstitial spaces of a uniform size in which molecules small enough to pass through the pores, cavities, or interstitial spaces are adsorbed while larger molecules are not. Examples of molecular sieves include zeolites and non-zeolite molecular sieves such as zeolite analogs including, but not limited to, SAPOs (silicoaluminophosphates), MeAPOs (metalloaluminophosphates), $AlPO_4$, and ELAPOs (nonmetal substituted aluminophosphate families).

As used herein, the term "pour point" refers to the temperature at which an oil will begin to flow under controlled conditions. The pour point may be determined by, for example, ASTM D5950.

"Target pour point" means the desired or required pour point of a lubricant base oil product. The target pour point is generally less than about −10° C., and typically in the range from about −10° C. to −50° C.

As used herein, "cloud point" refers to the temperature at which a lube oil sample begins to develop a haze as the oil is cooled under specified conditions. The cloud point of a lube base oil is complementary to its pour point. Cloud point may be determined by, for example, ASTM D5773.

The "pour point/cloud point spread," or "pour-cloud spread" of a base oil, refers to the spread or difference between the cloud point and the pour point, and is defined as the cloud point minus the pour point, as measured in ° C. Generally, it is desirable to minimize the spread between the pour and cloud points.

The Periodic Table of the Elements referred to in this disclosure is the CAS version published by the Chemical Abstract Service in the *Handbook of Chemistry and Physics*, 72nd edition (1991-1992).

"Group VIII metal" refers to elemental metal(s) selected from Group VIII of the Periodic Table of the Elements and/or to metal compounds comprising such metal(s).

Unless otherwise specified, the "feed rate" of a hydrocarbon feedstock being fed to a catalytic reaction zone is expressed herein as the volume of feed per volume of catalyst per hour, which may be referred to as liquid hourly space velocity (LHSV) with units of reciprocal hours ($h^{-1}$).

The term "hydroisomerization" refers to a process in which n-paraffins (n-alkanes) are isomerized to their more branched counterparts in the presence of hydrogen over a hydroisomerization (dewaxing) catalyst.

Unless otherwise specified, the recitation of a genus of elements, materials, or other components from which an individual component or mixture of components can be selected is intended to include all possible sub-generic combinations of the listed components and mixtures thereof. Also, "include" and its variants are intended to be non-limiting, such that recitation of items in a list is not to the exclusion of other like items that may also be useful in the materials, compositions, and methods of this invention.

Properties for the materials described herein may be determined as follows:

(a) $SiO_2/Al_2O_3$ Ratio (SAR): determined by ICP elemental analysis. A SAR of infinity ($\infty$) represents the case where there is no aluminum in the zeolite, i.e., the mole ratio of silica to alumina is infinity. In that case, the molecular sieve is comprised essentially of all silica.

(b) Surface area: determined by $N_2$ adsorption at its boiling temperature. BET surface area is calculated by the 5-point method at $P/P_0=0.050, 0.088, 0.125, 0.163$, and $0.200$. Samples are first pre-treated at 400° C. for 6 hours in the presence of flowing, dry $N_2$ so as to eliminate any adsorbed volatiles like water or organics.

(c) Micropore volume: determined by $N_2$ adsorption at its boiling temperature. Micropore volume is calculated by the t-plot method at $P/P_0=0.050, 0.088, 0.125, 0.163$, and $0.200$. Samples are first pre-treated at 400° C. for 6 hours in the presence of flowing, dry $N_2$ so as to eliminate any adsorbed volatiles like water or organics.

(d) Mesopore pore diameter: determined by $N_2$ adsorption at its boiling temperature. Mesopore pore diameter is calculated from $N_2$ isotherms by the BJH method described in E. P. Barrett, L. G. Joyner and P. P. Halenda, "The determination of pore volume and area distributions in porous substances. I. Computations from nitrogen isotherms" *J. Am. Chem. Soc.* 1951, 73, 373-380. Samples are first pre-treated at 400° C. for 6 hours in the presence of flowing, dry $N_2$ so as to eliminate any adsorbed volatiles like water or organics.

(e) Total pore volume: determined by $N_2$ adsorption at its boiling temperature at $P/P_0=0.990$. Samples are first pre-treated at 400° C. for 6 hours in the presence of flowing, dry $N_2$ so as to eliminate any adsorbed volatiles like water or organics.

Where permitted, all publications, patents and patent applications cited in this application are incorporated by reference herein in their entirety; to the extent such disclosure is not inconsistent with the present invention.

Hydrotreating Catalysts

In an embodiment, catalyst systems of the present invention may include a hydrotreating catalyst, e.g., in the form of a guard layer. Hydrotreating catalysts of the present invention may comprise a refractory inorganic oxide support and a Group VIII metal. The oxide support may also be referred to herein as a binder. The support of the hydrotreating catalyst may be prepared from or comprise alumina, silica, silica/alumina, titania, magnesia, zirconia, and the like, or combinations thereof. The catalyst support may comprise amorphous materials, crystalline materials, or combinations thereof. Examples of amorphous materials include, but are not limited to, amorphous alumina, amorphous silica, amorphous silica-alumina, and the like.

In an embodiment, the support may comprise amorphous alumina. When using a combination of silica and alumina, the distribution of silica and alumina in the support may be either homogeneous or heterogeneous. In some embodiments, the support may consist of an alumina gel in which is dispersed the silica, silica/alumina, or alumina base material. The support may also contain refractory materials other than alumina or silica, such as for example other inorganic oxides or clay particles, provided that such materials do not adversely affect the hydrogenation activity of the final catalyst or lead to deleterious cracking of the feedstock.

In a sub-embodiment, silica and/or alumina will generally comprise at least about 90 wt. % of the support of the hydrotreating catalyst, and in some embodiments the support may be at least substantially all silica or all alumina. Regardless of the type of support material in the hydrotreating catalyst, the hydrotreating catalyst used in processes and catalyst systems of the present invention will typically have low acidity. Where appropriate, the acidity of the support can be decreased by treatment with alkali and/or alkaline earth metal cations.

Various crystalline and non-crystalline catalyst support materials that may be used in practicing the present invention, as well as the quantification of their acidity levels and methods for neutralizing acid sites in the catalyst support are described in co-pending, commonly assigned U.S. Patent Application Publication No. 2011/0079540, the disclosure of which is incorporated by reference herein in its entirety.

The Group VIII metal component(s) of the hydrotreating catalyst may comprise platinum, palladium, or combinations thereof. In an embodiment, the hydrotreating catalyst comprises platinum and palladium with a Pt:Pd ratio in the range from about 5:1 to about 1:5, typically from about 3:1 to about 1:3, and often from about 1:1 to about 1:2. The Group VIII metal content of the hydrotreating catalyst may generally be in the range from about 0.01 wt. % to about 5 wt. %, typically from about 0.2 wt. % to about 2 wt. %. In an embodiment, the hydrotreating catalyst may comprise platinum at a concentration in the range from about 0.1 to about 1.0 wt. %, and palladium at a concentration in the range from about 0.2 to about 1.5 wt. %. In a sub-embodiment, the hydrotreating catalyst may comprise about 0.3 wt. % platinum and about 0.6 wt. % palladium. Hydrotreating catalysts of the present invention generally exhibit sulfur tolerance as well as high catalytic activity.

In an embodiment, the Group VIII metal of the hydrotreating catalyst may be dispersed on the inorganic oxide support. A number of methods are known in the art to deposit platinum and/or palladium metal, or compounds comprising platinum and/or palladium, onto the support; such methods include ion exchange, impregnation, and co-precipitation. In an embodiment, the impregnation of the support with platinum and/or palladium metal may be performed at a controlled pH value. Typically, the platinum and/or palladium may be added to the impregnating solution as a metal salt, such as a halide salt, and/or an amine complex, and/or a salt of a mineral acid. Ammonium salts have been found to be particularly useful in preparing solutions for Group VIII metal impregnation. Other examples of metal salts that may be used include nitrates, carbonates, and bicarbonates, as well as carboxylic acid salts such as acetates, citrates, and formates.

Optionally, the impregnated support may be allowed to stand with the impregnating solution, e.g., for a period in the range from about 2 to about 24 hours. Following impregnation of the oxide support with the Group VIII metal, the impregnated support can be dried and/or calcined. After the hydrotreating catalyst has been dried and calcined, the prepared catalyst may be reduced with hydrogen, as is conventional in the art, and placed into service.

Hydroisomerization Catalysts

In an embodiment, processes of the present invention use a layered catalyst system comprising a first hydroisomerization catalyst and a second hydroisomerization catalyst, wherein the first hydroisomerization catalyst may be disposed upstream from the second hydroisomerization catalyst. In an embodiment, both of the first and second hydroisomerization catalysts may be selective for the isomerization of n-paraffins in the hydrocarbon feed. In an embodiment, the first and second hydroisomerization catalysts have different formulations, and may have different levels of isomerization selectivity. In an embodiment, the first hydroisomerization catalyst may have a higher level of selectivity for the isomerization of n-paraffins as compared with the second hydroisomerization catalyst.

Each of the first and second hydroisomerization catalysts may comprise a molecular sieve and a Group VIII metal. In an embodiment, the molecular sieve of each of the first hydroisomerization catalyst and the second hydroisomerization catalyst may comprise a 1-D, 10-ring molecular sieve. The Group VIII metal of the first and second hydroisomerization catalysts may comprise platinum, palladium, or a combination thereof. In an embodiment, each of the first and second hydroisomerization catalysts may comprise from about 0.1 to about 1.5 wt. % of the Group VIII metal, typically from about 0.2 to about 1.0 wt. %, and usually from about 0.325 to about 1.0 wt. % of the Group VIII metal. In an embodiment, at least one of the first hydroisomerization catalyst and the second hydroisomerization catalyst may further comprise a metal modifier selected from the group consisting of Mg, Ca, Sr, Ba, K, La, Pr, Nd, Cr, and combinations thereof, substantially as described herein below.

Typically, each of the first and second hydroisomerization catalysts will still further comprise a support or binder. The support may comprise a refractory inorganic oxide. Suitable inorganic oxide supports for the hydroisomerization catalysts include silica, alumina, titania, magnesia, zirconia, silica-alumina, silica-magnesia, silica-titania, and the like, and combinations thereof. Each of the first hydroisomerization catalyst and the second hydroisomerization catalyst may comprise from about 5 to about 95 wt. % or more of the molecular sieve component, typically from about 15 to about 85 wt. % of the molecular sieve, and usually from about 25 to about 75 wt. % of the molecular sieve. Generally, it is advantageous to minimize the molecular sieve component for economic reasons, provided that the catalyst retains the required activity and selectivity levels. Each of the first hydroisomerization catalyst and the second hydroisomerization catalyst may comprise from about 0 to about 95 wt. % of the support material, and more typically from about 5 to about 90 wt. %.

In an exemplary catalyst system for dewaxing hydrocarbon feedstocks according to processes of the present invention, each of the first hydroisomerization catalyst and the second hydroisomerization catalyst may comprise a 1-D, 10-ring molecular sieve and a Group VIII metal. The molecular sieve of at least one of the first hydroisomerization catalyst and the second hydroisomerization catalyst may comprise a medium pore zeolite, e.g., a zeolite having a pore aperture in the range from about 0.39 nm to about 0.7 nm. In an embodiment, each of the first hydroisomerization catalyst and the second hydroisomerization catalyst may further comprise from about 0.325 wt. % to about 1 wt. % platinum.

Examples of molecular sieves that may be useful in formulating at least one of the first and second hydroisomerization catalysts include molecular sieves of the AEL framework type code, such as SAPO-11, SAPO-31, SM-3, SM-6; as well as zeolite type materials of the MTT or TON codes. Molecular sieves of the MTT code include ZSM-23, SSZ-32, EU-13, ISI-4, and KZ-1. Molecular sieves of the TON code that may be useful in practicing the present invention include Theta-1, ISI-1, KZ-2, NU-10, and ZSM-22. The parameters of MTT and TON type molecular sieves are further described in the *Atlas of Zeolite Framework Types* which is published by the International Zeolite Association (IZA). In an embodiment, at least one of the first hydroisomerization catalyst and the second hydroisomerization catalyst contain zeolite SSZ-32. In a sub-embodiment, each of the first hydroisomerization catalyst and the second hydroisomerization catalyst contains SSZ-32. Processes of the present invention are not limited to any particular hydroisomerization catalyst formulations.

Metal Loading of Catalysts

In an embodiment, at least one of the first hydroisomerization catalyst and the second hydroisomerization catalyst may further comprise one or more metal modifier(s). In a sub-embodiment, both the first hydroisomerization catalyst and the second hydroisomerization catalyst may each comprise a metal modifier. Typically, the metal modifier(s) may be selected from the group consisting of Mg, Ca, Sr, Ba, K, La, Pr, Nd, Cr, and combinations thereof. In a sub-embodiment, the metal modifier may comprise Mg. In an embodiment, a metal-modified catalyst of the present invention may comprise from about 0.5 to about 3.5 wt. % of Mg or other metal modifier(s), typically from about 0.5 to about 2.5 wt. %, and usually from about 0.9 to about 2.5 wt. % of Mg or other metal modifier(s).

In a process for the hydroisomerization of a light hydrocarbon feedstock according to an embodiment of the present invention, the first (i.e., upstream) hydroisomerization catalyst may include a metal modifier selected from the group consisting of Mg, Ca, Sr, Ba, K, La, Pr, Nd, Cr, and combinations thereof, whereas the second (i.e., downstream) hydroisomerization catalyst may at least substantially lack a metal modifier. Stated differently, in an embodiment a metal modifier component selected from the group consisting of Mg, Ca, Sr, Ba, K, La, Pr, Nd and Cr may be included in the first hydroisomerization catalyst, but omitted from the second hydroisomerization catalyst. As a non-limiting example, the first hydroisomerization catalyst may comprise a 1-D, 10-ring molecular sieve, such as SSZ-32; a Group VIII noble metal, such as platinum; and a metal modifier such as magnesium. In contrast, the second hydroisomerization catalyst may consist essentially of a 1-D, 10-ring molecular sieve, a Group VIII metal, and a refractory oxide support.

In formulating a catalyst or catalyst system for dewaxing processes of the present invention, a mixture of a molecular sieve and an oxide binder may be formed into a particle or extrudate having a wide range of physical shapes and dimensions. In an embodiment, the extrudate or particle may be dried and calcined prior to metal loading. Calcination may be performed at temperatures typically in the range from about 390° F. to about 1100° F. (199° C. to 593° C.) for periods of time ranging from about 0.5 to about 5 hours, or more. The calcined extrudate or formed particle may then be loaded with at least one metal modifier selected from the group consisting of Ca, Cr, Mg, La, Na, Pr, Sr, K, Nd, and combinations thereof. While not being bound by theory, such metals may effectively reduce the number of acid sites on the molecular sieve of the metal-modified hydroisomerization catalyst, thereby increasing the catalyst's selectivity for isomerization (versus cracking) of n-paraffins in the feed.

The loading of modifying metal(s) on the catalyst(s) may be accomplished by techniques known in the art, such as by impregnation or ion exchange. Ion exchange techniques typically involve contacting the extrudate or particle with a solution containing a salt of the desired metal cation(s). A variety of metal salts, such as halides, nitrates, and sulfates, may be used in this regard. Following contact with a salt solution of the desired metal cation(s), the extrudate or particle may be dried, e.g., at temperatures in the range from about 150° F. to about 800° F. (66° C. to 427° C.). The extrudate or particle may thereafter be further loaded with a Group VIII metal component of the catalyst.

In an embodiment, a molecular sieve or catalyst of the invention may be co-impregnated with a modifying metal and a Group VIII metal. After loading the Group VIII and modifying metals, the catalyst may be calcined in air or inert gas at temperatures in the range from about 500° F. to about 900° F. (260° C. to 482° C.). The preparation of molecular sieve catalysts comprising a metal modifier is disclosed in commonly assigned U.S. Pat. No. 7,141,529 and in U.S. Patent Application Publication No. 2008/0083657, the disclosure of each of which is incorporated by reference herein in its entirety.

Dewaxing Catalyst Systems

According to an embodiment of the present invention, a dewaxing catalyst system 10 for the production of base oils from a hydrocarbon feedstock may be described with reference to FIG. 1, as follows. Catalyst system 10 may be a layered system comprising a plurality of hydroisomerization catalyst layers. In an embodiment, each of the layers of hydroisomerization catalyst may have a different formulation, activity, and/or n-paraffin isomerization selectivity. By "n-paraffin isomerization selectivity" is meant the propensity of a given catalyst to isomerize, as opposed to crack, n-paraffins in the feedstock.

Catalyst system 10 may include a hydrotreating zone or guard layer 12, a first hydroisomerization zone 14, and a second hydroisomerization zone 16. Guard layer 12, first hydroisomerization zone 14, and second hydroisomerization zone 16 may contain, respectively, a hydrotreating catalyst 18, a first hydroisomerization catalyst 20, and a second hydroisomerization catalyst 22. Guard layer 12 may be disposed upstream from first hydroisomerization catalyst 20, and first hydroisomerization catalyst 20 may be disposed upstream from second hydroisomerization catalyst 22. In an embodiment as shown in FIG. 1, guard layer 12, first hydroisomerization zone 14, and second hydroisomerization zone 16 may be housed within a single reactor 24. Although the invention has been described with reference to FIG. 1 as comprising two hydroisomerization zones and a guard layer, other numbers of zones and layers are also possible under the present invention.

A hydrocarbon feed 26 may be introduced into reactor 24 via a first conduit 28a, while hydrogen gas may be introduced into reactor 24 via a second conduit 28b. Within reactor 24, feed 26 may be contacted with hydrotreating catalyst 18 in the presence of hydrogen to provide a hydrotreated feedstock 30. Hydrotreated feedstock 30 may be contacted with first hydroisomerization catalyst 20 under first hydroisomerization conditions in first hydroisomerization zone 14 to provide a first isomerization stream 32. First isomerization stream 32 may be contacted with second hydroisomerization catalyst 22 under second hydroisomerization conditions in second hydroisomerization zone 16 to provide a second isomerization stream 34.

Second isomerization stream 34 may be fed to a hydrofinishing unit (not shown) to provide a suitable quality and yield of the desired base oil product. The base oil product may have a pour point not higher than about −9° C., typically not higher than about −12° C., and usually not higher than about −14° C. The base oil product may have a cloud point not higher than about −5° C., typically not higher than about −7° C., and usually not higher than about −12° C. The base oil product may have a pour-cloud spread of not more than about 7° C., typically not more than about 5° C., and usually not more than about 3° C. In an embodiment, the base oil product having the above properties may be obtained at a yield of at least about 89%.

In an embodiment, hydrotreating catalyst 18 may be a high activity catalyst capable of operating effectively at a relatively high hourly liquid space velocity (e.g., LHSV>1 $h^{-1}$) and at a temperature in the range from about 550° F. to about 750° F. (288° C. to 399° C.). The hydrotreating catalyst (guard layer) may occupy from about 3% to about 30% by volume of the total catalyst volume, i.e., the hydrotreating catalyst may comprise from about 3% to about 30% of the sum of the volume of the hydrotreating catalyst plus the volume of the first hydroisomerization catalyst plus the volume of the second hydroisomerization catalyst. Typically, the hydrotreating catalyst may comprise from about 5% to about 20% of the total catalyst volume, and usually from about 5% to about 15% of the total catalyst volume.

In an embodiment, the ratio of the volume of the first hydroisomerization catalyst to the volume of the second hydroisomerization catalyst may be in the range from about 7:3 to about 3:7, typically from about 3:2 to about 2:3, and usually from about 5:4 to about 4:5. In a sub-embodiment, the ratio of the volume of the first hydroisomerization catalyst to the volume of the second hydroisomerization catalyst may be about 1:1.

Feed for Base Oil Production

The instant invention may be used to dewax a wide variety of light and medium hydrocarbon feedstocks. In an embodiment, the hydrocarbon feedstocks can be described as waxy feeds having pour points generally above about 0° C., and having a tendency to solidify, precipitate, or otherwise form solid particulates upon cooling to about 0° C. Straight chain n-paraffins, either alone or with only slightly branched chain paraffins, having 16 or more carbon atoms may be referred to herein as waxes. The feedstock will usually be a $C_{10+}$ feedstock generally boiling above about 350° F. (177° C.).

The present invention may also be suitable for processing waxy distillate stocks such as middle distillate stocks including gas oils, kerosenes, and jet fuels, lubricating oil stocks, heating oils, and other distillate fractions whose pour point and viscosity need to be maintained within certain specification limits.

Feedstocks for processes of the present invention may typically include olefin and naphthene components, as well as aromatic and heterocyclic compounds, in addition to higher molecular weight n-paraffins and slightly branched paraffins. During processes of the present invention, the degree of cracking of n-paraffins and slightly branched paraffins in the feed is strictly limited so that the product yield loss is minimized, thereby preserving the economic value of the feedstock.

In an embodiment, the feedstock for base oil production may comprise a light feed. Herein, the term "light feed" may be used to refer to a hydrocarbon feedstock wherein at least about 80% of the components have a boiling point below about 900° F. (482° C.). Examples of light feeds suitable for practicing the present invention include light neutral (100 to 150N) and medium neutral (200 to 250N).

In an embodiment, the hydrocarbon feedstocks of the present invention may generally have a pour point above 0° C., and in some embodiments above about 20° C. In contrast, the base oil products of processes of the present invention, resulting from hydroisomerization dewaxing of the feedstock, generally have pour points below 0° C., typically below about −12° C., and often below about −14° C.

In an embodiment, the feedstock employed in processes of the present invention can be a waxy feed which contains more than about 20% wax, more than about 50% wax, or even greater than about 70% wax. More typically, the feed will contain from about 5% to about 30% wax. As used herein, the term "waxy hydrocarbon feedstocks" may include plant waxes and animal derived waxes in addition to petroleum derived waxes.

According to one aspect of the present invention, a wide range of feeds may be used to produce lubricant base oils in high yield with good performance characteristics, including low pour point, low cloud point, low pour-cloud spread, and high viscosity index. The quality and yield of the lube base oil product of the instant invention may depend on a number of factors, including the formulation of the hydroisomerization catalysts comprising the layered catalyst systems and the configuration of the catalyst layers of the catalyst systems.

In an embodiment of the present invention, the quality and yield of the lube base oil product may depend on the orientation of the different hydroisomerization catalyst layers with respect to the feed stream. Applicants have now discovered that a hydroisomerization catalyst having a higher level of isomerization selectivity may be disposed upstream from a hydroisomerization catalyst having a lower level of isomerization selectivity to provide base oil products with improved characteristics and at increased yields, as compared with conventional processes and systems. Moreover, applicants have also observed that the opposite orientation of the hydroisomerization catalysts with respect to the feed stream may provide inferior results, e.g., decreased quality and/or quantity of base oil product. By "opposite orientation" in this regard is meant a catalyst system configuration wherein a hydroisomerization catalyst having a higher level of isomerization selectivity is disposed downstream from a hydroisomerization catalyst having a lower level of isomerization selectivity.

Dewaxing Processes

According to one embodiment of the present invention a catalytic dewaxing process for the production of base oils from a light hydrocarbon feedstock may involve introducing the feed into a reactor containing a dewaxing catalyst system. Hydrogen gas may also be introduced into the reactor so that the process may be performed in the presence of hydrogen, e.g., as described herein below with reference to the process conditions.

Within the reactor, the feed may be contacted with a hydrotreating catalyst under hydrotreating conditions in a hydrotreating zone or guard layer to provide a hydrotreated feedstock. Contacting the feedstock with the hydrotreating catalyst in the guard layer may serve to effectively hydrogenate aromatics in the feedstock, and to remove N- and S-containing compounds from the feed, thereby protecting the first and second hydroisomerization catalysts of the catalyst system. By "effectively hydrogenate aromatics" is meant that the hydrotreating catalyst is able to decrease the aromatic content of the feedstock by at least about 20%. The hydrotreated feedstock may generally comprise $C_{10+}$ n-paraffins and slightly branched isoparaffins, with a wax content of typically at least about 20%.

The hydrotreated feedstock may be contacted with the first hydroisomerization catalyst under first hydroisomerization dewaxing conditions in a first hydroisomerization zone to provide a first isomerization stream. Thereafter, the first isomerization stream may be contacted with the second hydroisomerization catalyst under second hydroisomerization dewaxing conditions in a second hydroisomerization zone to provide a second isomerization stream. The guard layer, the first hydroisomerization catalyst, and the second hydroisomerization catalyst may all be disposed within a single reactor. The hydrotreating and hydroisomerization conditions that may be used for catalytic dewaxing processes of the present invention are described herein below.

The second isomerization stream may be fed to a hydrofinishing unit to provide a suitable quality and yield of the desired base oil product. Such a hydrofinishing step, may remove traces of any aromatics, olefins, color bodies, and the like from the base oil product. The hydrofinishing unit may include a hydrofinishing catalyst comprising an alumina support and a noble metal, typically palladium, or platinum in combination with palladium. In an embodiment, the noble metal content of the hydrofinishing catalyst may typically be in the range from about 0.1 to about 1.0 wt. %, usually from about 0.1 to about 0.6 wt. %, and often from about 0.2 to about 0.5 wt. %.

Each of the first hydroisomerization catalyst and the second hydroisomerization catalyst may comprise a 1-D, 10-ring molecular sieve and a Group VIII metal, e.g., substantially as described herein above under "Hydroisomerization Catalysts." Each of the first hydroisomerization catalyst and the second hydroisomerization catalyst may be selective for the isomerization of n-paraffins in the feedstock, such that feedstock components are preferentially isomerized rather than cracked.

According to one aspect of the present invention, the first and second hydroisomerization catalysts may have different levels of selectivity for the isomerization of n-paraffins in the feedstock. In an embodiment, the first hydroisomerization catalyst may be more selective for the isomerization of n-paraffins in the feedstock as compared with the second hydroisomerization catalyst (see, e.g., FIG. 2A). Stated differently, in an embodiment of the present invention the first hydroisomerization catalyst may have a first level of selectivity for the isomerization of n-paraffins in the feedstock and the second hydroisomerization catalyst may have a second level of selectivity for the isomerization of n-paraffins in the feedstock, wherein the first level of selectivity may be higher than the second level of selectivity.

Figure 2B:
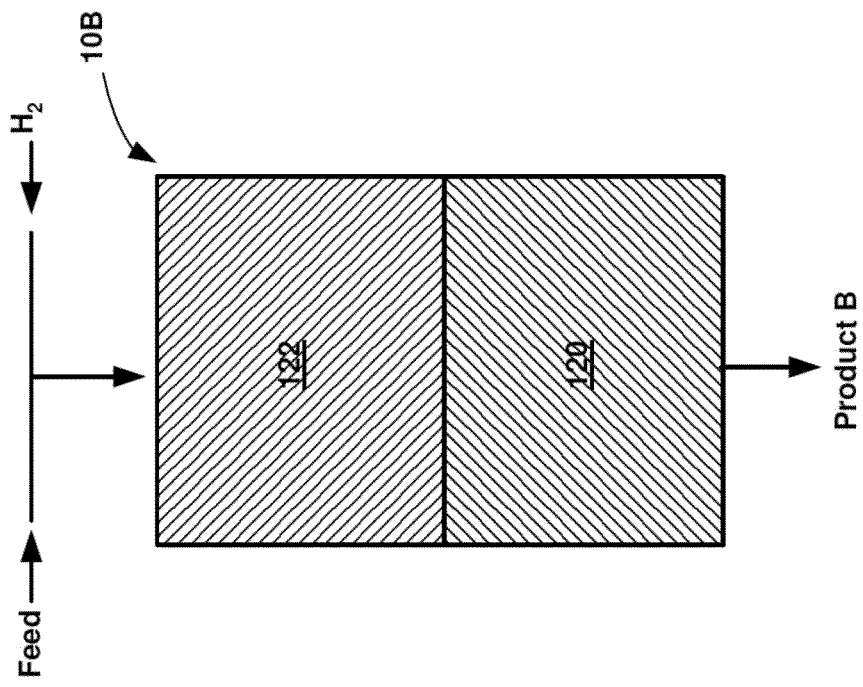
FIG. 2B schematically represents a layered dewaxing catalyst system having the inverse configuration of the system of FIG. 2A.
Figure 2A:
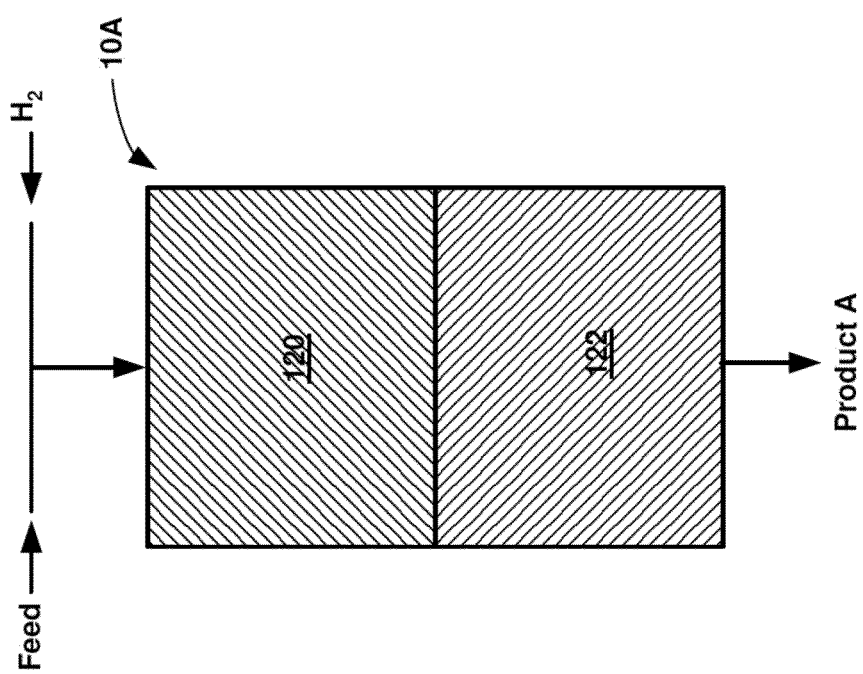
FIG. 2A schematically represents a layered dewaxing catalyst system, according to an embodiment of the present invention.

FIG. 2A schematically represents a layered dewaxing catalyst system 10A, according to an embodiment of the present invention. Catalyst system 10A comprises a first hydroisomerization catalyst 120 disposed upstream from a second hydroisomerization catalyst 122. In an embodiment, first hydroisomerization catalyst 120 may have a higher level of selectivity for the isomerization of n-paraffins as compared with second hydroisomerization catalyst 122. FIG. 2B schematically represents a layered dewaxing catalyst system 10B having the same composition, but the opposite orientation as compared with catalyst system 10A of FIG. 2A, i.e., in catalyst system 10B hydroisomerization catalyst 120 is disposed downstream from hydroisomerization catalyst 122.

With further reference to FIG. 2A-B, a waxy hydrocarbon feed may be contacted with hydroisomerization catalysts 120 and 122 in the presence of hydrogen to provide a base oil product. In particular, catalyst system 10A provides a dewaxed product A, while catalyst system 10B provides a dewaxed product B, wherein product A is, surprisingly, substantially superior to product B. Accordingly, applicants have found that the combination of first hydroisomerization catalyst 120 disposed upstream from second hydroisomerization catalyst 122 (e.g., FIG. 2A) can provide a superior base oil product, as compared with the inverse configuration (FIG. 2B).

According to another aspect of the present invention, applicants have also found that the combination of the first hydroisomerization catalyst upstream from the second hydroisomerization catalyst can provide equal or superior results, as compared with the same volume of catalyst of either the first hydroisomerization catalyst alone or the second hydroisomerization catalyst alone (see, e.g., Table 2). The superior results referred to herein above with respect to the use of layered catalyst systems for lube oil production may be manifest not only as increased product yield but also improved product qualities (see, e.g., Table 2). In an embodiment, the present invention provides a base oil product from a waxy light hydrocarbon feed at a yield of about 89%, wherein the base oil has a pour point of −14° C. and a VI of 108.

Reaction Conditions

The conditions under which processes of the present invention are carried out will generally include a temperature within a range from about 390° F. to about 800° F. (199° C. to 427° C.). In an embodiment, each of the first and second hydroisomerization dewaxing conditions includes a temperature in the range from about 550° F. to about 700° F. (288° C. to 371° C.). In a further embodiment, the temperature may be in the range from about 590° F. to about 675° F. (310° C. to 357° C.). The pressure may be in the range from about 15 to about 3000 psig (0.10 to 20.68 MPa), and typically in the range from about 100 to about 2500 psig (0.69 to 17.24 MPa).

Typically, the feed rate to the catalyst system/reactor during dewaxing processes of the present invention may be in the range from about 0.1 to about 20 h$^{-1}$ LHSV, and usually from about 0.1 to about 5 h$^{-1}$ LHSV. Generally, dewaxing processes of the present invention are performed in the presence of hydrogen. Typically, the hydrogen to hydrocarbon ratio may be in a range from about 2000 to about 10,000 standard cubic feet H$_2$ per barrel hydrocarbon, and usually from about 2500 to about 5000 standard cubic feet H$_2$ per barrel hydrocarbon.

The above conditions may apply to the hydrotreating conditions of the hydrotreating zone as well as to the hydroisomerization conditions of the first and second hydroisomerization zones. The reactor temperature and other process parameters may vary according to factors such as the nature of the hydrocarbon feedstock used and the desired characteristics (e.g., pour point, cloud point, VI) and yield of the base oil product.

The hydrotreating catalyst may be disposed upstream from the hydroisomerization catalysts and in the same reactor as the hydroisomerization catalysts. In an embodiment, a temperature difference may exist between the first and second hydroisomerization zones. For example, the first hydroisomerization zone may be at a first temperature and the second hydroisomerization zone may be at a second temperature, wherein the second temperature may be from about 20° F. to about 60° F. higher than the first temperature, more typically from about 30° F. to about 50° F. higher, and usually from about 35° F. to about 45° F. higher than the first temperature.

The effluent or stream from a catalyst system of the present invention, e.g., the second hydroisomerization stream from the second hydroisomerization zone, may be further treated by hydrofinishing. Such hydrofinishing may be performed in the presence of a hydrogenation catalyst, as is known in the art. The hydrogenation catalyst used for hydrofinishing may comprise, for example, platinum, palladium, or a combination thereof on an alumina support. The hydrofinishing may be performed at a temperature in the range from about 400° F. to about 650° F. (204° C. to 343° C.), and a pressure in the range from about 400 psig to about 4000 psig (2.76 to 27.58 MPa). Hydrofinishing for the production of lubricating oils is described, for example, in U.S. Pat. No. 3,852,207, the disclosure of which is incorporated by reference herein.

Base Oil Product

In an embodiment, processes of the invention provide a high value, high quality lubricant oil in good yield from a low value waxy hydrocarbon feedstock. The lubricant oils of the present invention will typically have a pour point less than about 9° C., usually less than about −12° C., and often less than about −14° C., e.g., as measured by ASTM D97. In an embodiment, the lubricant oil product may have a pour point in the range from about −10° C. to about −30° C. The products of the present invention will generally have viscosities in the range of 3 to 30 cSt at 100° C., and a VI in the range from about 95 to about 170 as measured by ASTM D445.

As noted herein above, the dewaxed second hydroisomerization stream (FIG. 1) may be further hydrotreated, for example, over one or more hydrofinishing catalysts to obtain a final lubricant oil product having the desired characteristics. As an example, at least a portion of the second hydroisomerization stream may be hydrofinished to remove any colored materials and/or to hydrogenate any aromatic species in order to meet the desired lubricant oil specifications and/or to improve the stability of the base oil product.

The following Examples illustrate but do not limit the present invention.

EXAMPLES

Example 1

Hydroisomerization catalyst A was prepared as follows. Zeolite SSZ-32 was composited with alumina to provide a mixture containing 45 wt. % zeolite, and the mixture was extruded, dried, and calcined. A metal-modified catalyst was then prepared by impregnating the dried and calcined extrudate with a solution containing both platinum and magnesium. The co-impregnated catalyst was then dried and calcined to provide an overall platinum loading of 0.325 wt. % and a magnesium loading of 2.5 wt. %.

Hydroisomerization catalyst B was prepared as follows. Zeolite SSZ-32 was composited with alumina to provide a mixture containing 65 wt. % zeolite, and the mixture was extruded, dried, and calcined. The dried and calcined extrudate was impregnated with a solution containing platinum, and the Pt impregnated catalyst was then dried and calcined. The overall platinum loading was 0.325 wt. %.

Hydrofinishing catalyst C was prepared by impregnating silica-alumina (SIRAL®-40, Sasol) with Pt and Pd to give a loading of 0.2 wt. % Pt and 0.16 wt. % Pd. The compositions of the hydroisomerization catalysts (A and B) and the hydrofinishing catalyst (C) are summarized in Table 1.

TABLE 1

Catalyst Compositions

| Catalyst | Wt. % Mol. Sieve | Support | % Pt | % Pd | % Mg |
|---|---|---|---|---|---|
| A | 65% SSZ-32 | alumina | 0.325 | — | — |
| B | 45% SSZ-32 | alumina | 0.325 | — | 2.5 |
| C | — | silica-alumina | 0.2 | 0.16 | — |

Comparative Example A

Dewaxing Light Feed using Hydroisomerization Catalyst B Alone

A waxy 100N light hydrocrackate feed having an API of 34, a wax content of 12.5%, a viscosity at 100° C. of 3.92 cSt was dewaxed over 8 cc of catalyst B (crushed 24/40 mesh) in a ⅜ inch diameter stainless steel down-flow reactor under isothermal conditions. The hydroisomerization conditions were 1.6 $h^{-1}$ LHSV, a once-through hydrogen rate of 3900 standard cubic feet per barrel (scf/bbl) gas/oil ratio, and a total pressure of 2000 psig. The temperature was adjusted to 610° F. to achieve the target pour point in the range of −12 to −14° C. The dewaxed effluent from catalyst B was subjected to hydrofinishing over 8 cc of catalyst C to provide a base oil product at a yield of 86% (wt. % 600° F.) with a pour point of −12° C. and a VI of 107 (Table 2).

Comparative Example B

Dewaxing Light Feed using Hydroisomerization Catalyst A Alone

The light hydrocarbon feed as described in Example A was dewaxed over 120 cc of catalyst A (whole extrudate). The hydroisomerization conditions were 1.6 $h^{-1}$ LHSV, a hydrogen recycle rate of 3000 scf/bbl, and a total pressure of 2000 psig. The dewaxing temperature was adjusted to 650° F. to achieve the target pour point in the range of −12 to −14° C. The effluent from catalyst A was hydrofinished over 120 cc of catalyst C to provide a base oil product at a yield of 88.5% (wt. % 600° F.) with a pour point of −13° C. and a VI of 108 (Table 2).

Comparative Example C

Dewaxing Light Feed using Layered Catalyst System B/A

The light hydrocarbon feed as described in Example A was dewaxed using a layered catalyst system comprising 4 cc of catalyst B (crushed 24/40 mesh) disposed over 4 cc of catalyst A (crushed 24/40 mesh), such that catalyst A was downstream from catalyst B (see, e.g., FIG. 2B). The dewaxing conditions were as described in Example A, except the gas/oil ratio was 3000 scf/bbl, and the temperature was adjusted to 630° F. to achieve the target pour point. The effluent from the layered catalyst system B/A was hydrofinished as described in Example A to provide a base oil product at a yield of 87.3% (wt. % 600° F.) with a pour point of −13° C. and a VI of 106 (Table 2).

Example 2

Dewaxing Light Feed using Layered Catalyst System A/B

The light hydrocarbon feed as described in Example A was dewaxed using a layered catalyst system comprising 4 cc of catalyst A (crushed 24/40 mesh) disposed over 4 cc of catalyst B (crushed 24/40 mesh), such that catalyst B was downstream from catalyst A (see, e.g., FIG. 2A). The dewaxing conditions were as described in Example A, except the gas/oil ratio was 3000 scf/bbl, and the dewaxing temperature was adjusted to 625° F. to achieve the target pour point. The effluent from the layered catalyst system was hydrofinished as described in Example A to provide a base oil product at a yield of 88.9% (wt. % 600° F.) with a pour point of −14° C. and a VI of 108 (Table 2).

Comparative Example D

Dewaxing Light Feed using Catalyst System B/A with a Temperature Differential The light hydrocarbon feed as described in Example A was dewaxed as described in Example C, except a 40° F. temperature difference was maintained between catalyst B (613° F.) and catalyst A (653° F.). The yield of base oil product was 87% (wt. % 600° F.) with a pour point of −14° C. and a VI of 107 (Table 2).

Example 3

Dewaxing Light Feed using Catalyst System A/B with a Temperature Differential The light hydrocarbon feed as described in Example A was dewaxed as described in Example 2, except a 40° F. temperature difference was maintained between catalyst A (595° F.) and catalyst B (635° F.). The yield of base oil product was 89% (wt. % 600° F.) with a pour point of −12° C. and a VI of 108 (Table 2). The superior results, as expressed by yield and VI, obtained using the layered catalyst system configuration of Example 2 were once again evident during dewaxing in the presence of a temperature differential within the catalyst system.

TABLE 2

Base oil product yields and characteristics

| Example | Dewax Catalyst(s) | Yield[1] | Pour Point (° C.) | VI |
|---|---|---|---|---|
| A | B | 86 | −12 | 107 |
| B | A | 88.5 | −13 | 108 |
| C | B/A | 87.3 | −13 | 106 |
| 2 | A/B | 88.9 | −14 | 108 |
| D | [2]B/A | 87 | −14 | 107 |
| 3 | [2]A/B | 89 | −12 | 108 |

[1]Yield is expressed as wt. % (of the feed) that boils at 600° F. or higher
[2]Dewaxing with a 40° F. temperature difference between catalysts A and B It can be seen from the results presented in Table 2 that the layered catalyst system configuration, having the more selective hydroisomerization catalyst as the first (upstream) layer (system A/B), provided a superior base oil product (in terms of VI, pour point, and yield) as compared with the inverse orientation of the first and second catalyst layers (system B/A). It can also be seen that catalyst system A/B provided an equal or better product as compared with the use of an equal volume of either catalyst A alone or catalyst B alone. Thus, according to one aspect of the present invention, a less expensive catalyst may be combined with a more expensive catalyst to form a catalyst system that provides equal or better performance at a lower cost, as compared with the same amount of the more expensive catalyst alone.

Numerous variations of the present invention may be possible in light of the teachings and examples herein. It is therefore understood that within the scope of the following claims, the invention may be practiced otherwise than as specifically described or exemplified herein.

The invention claimed is:

1. A process for catalytically dewaxing a light waxy hydrocarbon feedstock, comprising:
   a) contacting the hydrocarbon feedstock in a first hydroisomerization zone under first hydroisomerization dewaxing conditions with a first hydroisomerization catalyst to provide a first isomerization stream; and
   b) contacting at least a portion of the first isomerization stream in a second hydroisomerization zone under second hydroisomerization dewaxing conditions with a second hydroisomerization catalyst to provide a second isomerization stream, wherein each of the first hydroisomerization catalyst and the second hydroisomerization catalyst comprises zeolite SSZ-32 and a Group VIII metal; the first hydroisomerization catalyst further comprising a metal modifier selected from the group consisting of Mg, Ca, Sr, Ba, K, La, Pr, Nd, Cr, and combinations thereof; and the second hydroisomerization catalyst consists essentially of the molecular sieve, the Group VIII metal, and a refractory oxide binder;
   wherein the first hydroisomerization catalyst has a first level of selectivity for the isomerization of n-paraffins in the feedstock, the second hydroisomerization catalyst has a second level of selectivity for the isomerization of n-paraffins in the feedstock, and wherein the first level of selectivity is higher than the second level of selectivity.

2. The process according to claim 1, wherein at least about 80% of the feedstock components have a boiling point above about 900° (482° C.).

3. The process according to claim 1, wherein the metal modifier comprises Mg at a concentration in the range from about 0.5 to about 2.5 wt. %.

4. The process according to claim 1, wherein the first hydroisomerization catalyst and the second hydroisomerization catalyst are disposed within a single reactor.

5. The process according to claim 1, further comprising:
   c) prior to step a), contacting the hydrocarbon feedstock in a hydrotreating zone under hydrotreating conditions with a hydrotreating catalyst.

6. The process according to claim 5, wherein the hydrotreating zone comprises a guard layer comprising the hydrotreating catalyst, and wherein the guard layer, the first hydroisomerization zone, and the second hydroisomerization zone are disposed within a single reactor.

7. The process according to claim 5, wherein the hydrotreating catalyst comprises a refractory inorganic oxide in combination with i) platinum at a concentration in the range from about 0.1 to about 1 wt. %, and ii) palladium at a concentration in the range from about 0.2 to about 1.5 wt. %.

8. The process according to claim 5, wherein the hydrotreating catalyst occupies a volume in the range from about 3% to about 30% of the total volume of the hydrotreating catalyst, the first hydroisomerization catalyst and the second hydroisomerization catalyst.

9. The process according to claim 1, wherein the ratio of the volume of the first hydroisomerization catalyst to the volume of the second hydroisomerization catalyst is in the range from about 3:2 to about 2:3.

10. The process according to claim 1, wherein each of the first and second hydroisomerization dewaxing conditions includes a temperature in the range from about 550° F. to about 750° F. (288° C. to 399° C.).

11. The process according to claim 1, wherein the first hydroisomerization zone is at a first temperature, the second hydroisomerization zone is at a second temperature, and wherein the second temperature is from about 30° F. to about 50° F. higher than the first temperature.

12. The process according to claim 1, further comprising:
   d) contacting the second isomerization stream with a hydrofinishing catalyst in the presence of hydrogen to provide a base oil product having a pour point of not more than about −12° C., and a pour-cloud spread of not more than about 5° C.

13. The process according to claim 12, wherein the base oil product is obtained at a yield of at least about 89%.

14. A process for catalytically dewaxing a waxy hydrocarbon feedstock, comprising:
   a) contacting the hydrocarbon feedstock in a first hydroisomerization zone under first hydroisomerization dewaxing conditions with a first hydroisomerization catalyst to provide a first isomerization stream;
   b) contacting at least a portion of the first isomerization stream in a second hydroisomerization zone under second hydroisomerization dewaxing conditions with a second hydroisomerization catalyst to provide a second isomerization stream; and
   c) contacting the second isomerization stream with a hydrofinishing catalyst to provide a base oil product, wherein each of the first hydroisomerization catalyst and the second hydroisomerization catalyst comprises a zeolite SSZ-32 and a Group VIII metal; the first hydroisomerization catalyst has a first level of selectivity for the isomerization of n-paraffins in the feedstock, the second hydroisomerization catalyst has a second level of selectivity for the isomerization of n-paraffins, and wherein the first level of selectivity is higher than the second level of selectivity; the first hydroisomerization catalyst is doped with a metal modifier selected from the group consisting of Mg, Ca, Sr, Ba, K, La, Pr, Nd and Cr; the second hydroisomerization catalyst consists essentially of a refractory oxide binder, the zeolite SSZ-32 and the Group VIII metal; the first and second hydroisomerization catalysts are disposed in the same reactor, and wherein the base oil product has a pour point of not more than about −12° C. and a pour-cloud spread of not more than about 5° C.

* * * * *